UNITED STATES PATENT OFFICE.

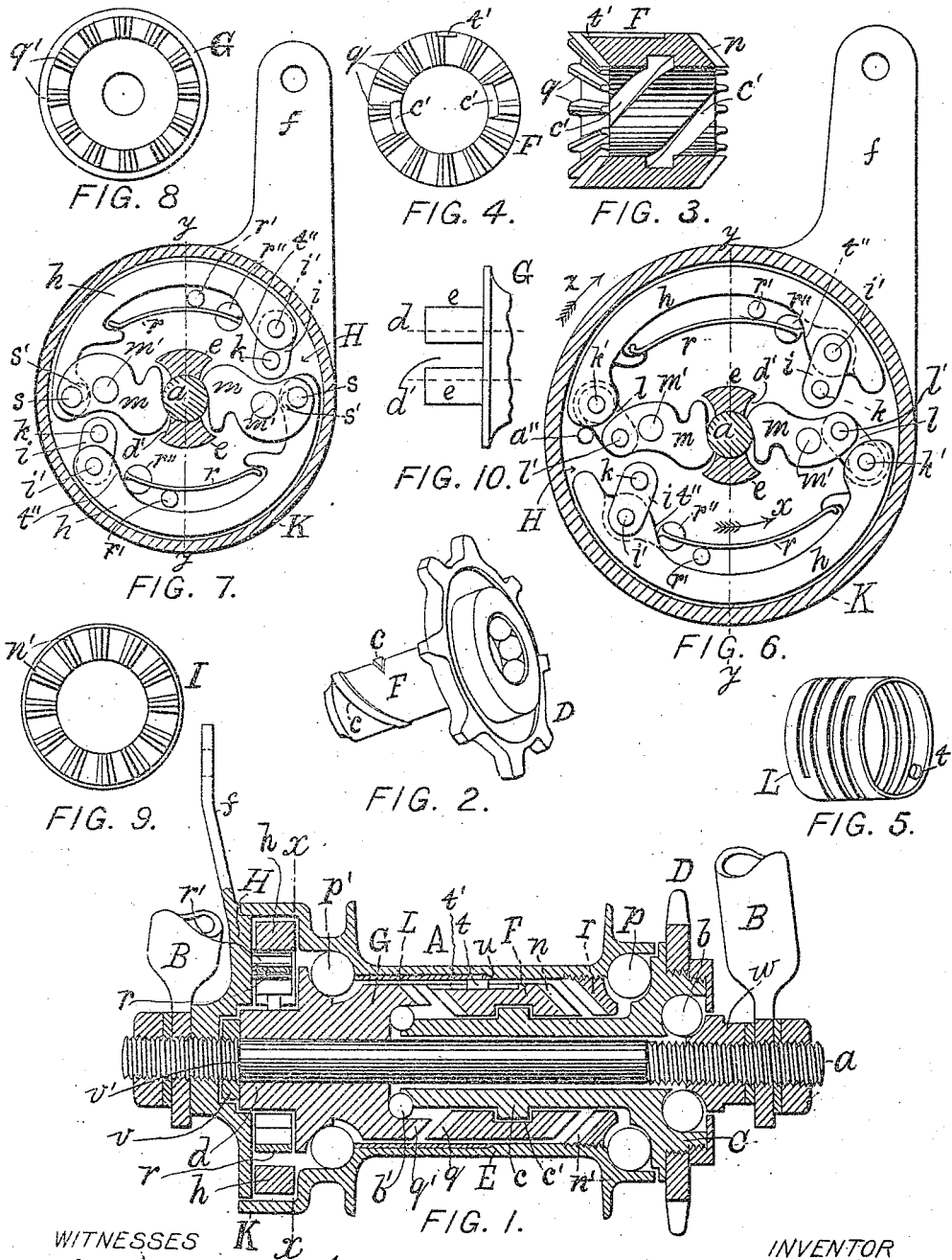

WILLIAM ROBINSON, OF BROOKLYN, NEW YORK, ASSIGNOR TO MIAMI CYCLE & MANUFACTURING COMPANY, OF MIDDLETOWN, OHIO.

VEHICLE BRAKE AND COASTER.

968,604.  Specification of Letters Patent.  Patented Aug. 30, 1910.

Application filed February 28, 1902. Serial No. 96,048.

*To all whom it may concern:*

Be it known that I, WILLIAM ROBINSON, a citizen of the United States, and a resident of Brooklyn, in the county of Kings and State of New York, have invented a new and Improved Vehicle Brake and Coaster, of which the following is a specification.

The nature of my invention will be clearly understood from the description which follows, reference being had to the accompanying drawing, which forms a part of this specification, in which—

Figure 1 is a longitudinal sectional view of a bicycle hub on the line $y, y$, Figs. 6 and 7, illustrating my invention; Fig. 2 is a perspective view of the driving sleeve with the driver attached thereto; Fig. 3 is a longitudinal section showing an interior view of the clutch sleeve, and Fig. 4 is an end view of the same looking from the left. Fig. 5 is a perspective view of a slotted tubular spring; Fig. 6 is an inside plan view of the brake mechanism, through the line $x\ x$, Fig. 1, and Fig. 7 is a similar view of same showing an alternative connection between the brake shoe and the brake lever. Fig. 8 is an inner end view of the brake actuator, looking toward the left, and Fig. 9 is an inner end view of the driving clutch member which is secured to the outer hub sleeve, looking toward the right, while Fig. 10 shows a detached detail giving a side view of the projections constituting the outer end of the brake actuator.

A represents a bicycle hub in which $a$ represents the supporting axle secured to the frame B of a bicycle, in the usual manner. The driving or gear sleeve C, to which the driving sprocket or gear D is secured, projects within the outer or hub sleeve E and is supported rotatably, at one end by the supporting shaft and at its opposite end by the brake actuator, and rotates on the ball bearings $b, b'$, as shown. The driving sleeve C is provided on its exterior with quick acting screw threads or spirals $c$ which engage corresponding spiral grooves $c'$ on the interior of the clutch sleeve F, located between said driving sleeve C and the outer hub E.

G is a brake actuator mounted on the shaft $a$ and arranged to rotate slightly thereon. Said brake actuator has its outer reduced end $d$ cut away at opposite sides of the supporting shaft as shown at $d'$, Figs. 6, 7 and 10, thus leaving the projections $e, e$ at opposite sides of said supporting shaft. The non-rotatable brake plate H, provided with the extension $f$, is supported by the shaft $a$ at its center, while the said extension $f$, secured to the lower fork side B of the bicycle, by a strap or band, in the usual manner, thus renders said plate H non-rotatable and stationary with reference to the revolving hub. The brake shoes and their immediate attachments are secured to said non-rotatable plate, movably but non-rotatably. The brake shoes $h$ are provided with links $i$ pivoted thereto at one end, as shown at $i'$, while the opposite ends of said links are pivotally connected to the brake plate H, as shown at $k$. The opposite ends of the shoes $h$, as shown in Fig. 6, are provided with links $l$ having one end pivotally connected to said shoes, as shown at $k'$, and the opposite ends pivotally connected to the outer ends of the brake levers $m$ as shown at $l'$. The levers $m$ are pivoted to the plate H, as shown at $m'$, at opposite sides of the axle $a$, while the projections $e, e$ from the outer end of the brake actuator G project out between the levers $m$, in operative relation thereto.

The operation is as follows: When the driving sleeve C is rotated forward by the driver D, in driving the wheel, the spirals $c$ of said driving sleeve draw the clutch sleeve F to the right until the beveled teeth $n$ thereof engage the beveled teeth $n'$ of the clutch member I, thus the driving sleeve C is securely locked, without possibility of slipping, to the outer hub E, through said clutch sleeve F, and the wheel and the machine are driven forward.

When it is desired to coast the pedals are held stationary and the revolving outer hub E instantly drives the clutch sleeve F along the spirals $c$ of the driving sleeve C, to the position shown in Fig. 1. Thus the outer hub E instantly clears itself from all connection with the clutch sleeve F, without friction or sticking or jerking, and coasts freely on the ball bearings $p, p'$.

To apply the brake the crank shaft is rotated backward, thus rotating the driving sleeve C backward. This, through the reversed action of the spiral $c$, moves the clutch sleeve F to the left until the teeth of the bevel gear $q$ thereof engage the beveled gear teeth $q'$ of the brake actuator G. A little further back pressure now rotates said brake actuator backward, thus carrying its projections $e$ in the direction of the arrow $x$, Fig. 6. These projections $e$ engage the inner ends of the levers $m$, thus swinging said levers on their pivots $m'$ and applying the brake shoes $h$ to the inside of the brake drum K, which is secured to, or forms a part of, the rotating outer hub E and overlaps said brake shoes, as shown in Fig. 1. Thus the coasting wheel is kept under complete control and instantly slowed down and quickly stopped, if desired, according to the pressure applied to the brake, and without any possible sticking or jar. When the braking pressure is removed the springs $r$ release the brake and carry the brake shoes clear of the inner surface of the brake drum, thus obviating the possibility of their interfering with the free driving of the wheel. Furthermore, the removal of the braking pressure carries the clutch sleeve F clear of the teeth $q'$ of the brake actuator G and into the position shown in Fig. 1; therefore, it is only necessary to have the brake springs stiff enough to withdraw the shoes and turn the brake actuator slightly on its axis.

The brake shoes $h$ are preferably made of bronze, or similar material, and inelastic and with a peripheral curved face described on the same radius as that of the inner periphery of the brake drum K. Inspection will show that with the peculiar construction and arrangement of brake shoes and links shown, the turning of the levers $m$ on their pivots will throw the brake shoes $h$ adjustably against the inner periphery of the brake drum K in such a way that the whole peripheral surface of each shoe is brought into contact with the inner peripheral surface of said brake drum, thus forming a much more efficient and reliable brake than those heretofore proposed. Furthermore, as the brake shoes are applied by pushing them forward somewhat, in the direction of rotation of the coasting wheel, the forward rotation of the wheel tends to aid in applying the brake more firmly when the shoes are brought into contact with the inner periphery of the brake drum, the toggle links enhancing the pressure.

The construction shown in Fig. 7 is precisely the same as that shown in Fig. 6, except that instead of the link $l$ shown at the lever end of the shoes $h$ the outer ends of the levers $m$ are pivotally connected directly to the ends of the brake shoes adjacent thereto, as shown at $s$. In this case the shoe $h$ is provided with a slight slot $s'$ to allow outward movement relatively to the pivot $s$. This construction is regarded as an alternative and equivalent construction to that shown at $l$ in Fig. 6, as each provides for an outward, forward and automatically adjustable movement of the brake shoe.

In order that there may be no possibility of sticking between the driving sleeve C and the clutch sleeve F when the former is rotated backward or forward, thus interfering with prompt action, it is desirable that the clutch sleeve F should be provided with a slight resistance against rotation. This is done as follows: The slotted spring sleeve L is provided with the inwardly projecting pin $t$ which engages the longitudinal slot $t'$ on the outer surface of the clutch sleeve F. Said slotted sleeve L is slightly compressed between the shoulder $u$ on the interior of the hub sleeve E and the balls of the ball bearings $p'$. This offers sufficient resistance to prevent the clutch sleeve F from being turned by the turning of the driving sleeve C before said clutch sleeve has engaged one or the other set of teeth $n'$ or $q'$ of the driving or braking clutch members.

In the act of driving, the driving sleeve C, the clutch sleeve F, the slotted spring sleeve L and the outer hub sleeve E are all locked together and rotated on the bearings $p$, $p'$ as one rotating device, while in coasting all these elements remain stationary except the outer hub E which coasts on the same bearings. It will be observed that the ball bearings $p'$ are arranged between the outer hub E and the brake actuator G, a matter of convenience of arrangement, while the bearings $p$, at the opposite end of the hub, are arranged between the outer hub E and the driving sleeve C. Again the bearings $b'$, at the inner end of the driving sleeve C, are shown as arranged between said sleeve C and the brake actuator G, a matter of convenience also, as in this case the movable brake actuator G is, for the purpose of this bearing, equivalent to a ball cup fixed or otherwise secured to the axle $a$ and corresponding to the cone shaped inner end of the driving sleeve C, as shown.

The collar $v$ is brought against a shoulder $v'$ on the left hand end of the axle $a$ and this collar $v$ forms a solid bearing and stop against which the fixed plate H is pressed, while at the opposite end of said axle $a$ the cone $w$ forms a stop for the jaw B of the bicycle frame. Thus the external pressure applied in securing the hub A in position between the jaws B, B, of the bicycle is prevented from interfering in any manner with the free movement of any of the moving elements of said hub A. The studs $r''$, secured to the fixed plate H, form an anchorage for one end of the brake release springs $r$, while the studs or pins $r'$, also secured to said fixed plate H, regulate the tension of said springs $r$ upon or against the brake shoes $h$.

It will be noticed that the brake shoes $h$ are provided, preferably near the ends opposite the lever ends of the shoes, with shoulders $t''$ which come against the studs $r''$ when the brake is released. Thus the brake shoes, when released, are permitted to be withdrawn only a slight predetermined distance from the inner periphery of the brake drum K. Furthermore, this arrangement prevents the possibility of the shoes swinging backward on their toggle links far enough to push the lever ends of said released shoes against the brake drum K. Thus possibility of accidental contact between the released brake shoes and the brake drum is provided against. Inspection will show that the brake levers $m$, in the released position of the brake shoes shown in Figs. 6 and 7, rest against the axle or shaft $a$. This is a convenient means of limiting the recession of said levers $m$. But it will be understood that any other stop or means of limiting and defining the released position of the shoes, whether applied directly to the levers $m$, to the shoes, or to any other suitable part of the operative brake mechanism, will be equally effective; for instance, the pin $a''$ limiting the recession of the connecting link $l$ or of the end of the shoe $h$, will accomplish the same result.

A decided advantage of the bevel gear construction of the clutch members is that while they interlock instantly and firmly, and without possibility of slipping, although the teeth are beveled on both sides, yet they release much more readily than is possible with any friction clutch connection, and, it is believed, more readily and positively than any other form of clutch used for similar purposes. The teeth of these beveled clutch gears are brought down to a sharp or rounded edge externally, (see Fig. 3) so that it is impossible for the clutching members to foul each other, or to fail to interlock the instant they are brought together. Furthermore, the teeth of these intermeshing beveled clutch gears are inclined, one set at an acute angle, and the teeth of its corresponding gear at an obtuse angle, to the axis of the hub, that is, of the gears, whereby said teeth have a greater bearing surface, and consequently greater strength and durability, than when said teeth are constructed and arranged at right angles to their axes. With this construction of clutch the wheel will not only coast, but it may be rolled backward like any ordinary wheel.

Having thus described my invention, what I claim as new and desire to secure by Letters Patent, is:

1. A brake mechanism for coaster brakes and the like, said mechanism comprising a non-rotatable fixture, a plurality of nonyielding brake shoes, each having one end adjustably connected to said fixture, a brake actuating device, flexible connections interposed between the opposite ends of said shoes and said brake actuating device to impart to said shoes an outward movement, and means for coupling said brake actuating device with the motive power therefor.

2. A brake mechanism for coaster brakes and the like, comprising a wheel hub, a plurality of brake shoes, a portion of the hub overlapping said shoes, a stationary brake member, a brake actuating device, flexible connections interposed between one end of said respective brake shoes and said brake actuating device to impart to said shoes an outward movement in the direction of forward rotation of the hub, means for connecting the opposite ends of said shoes adjustably to said stationary brake member, and means for coupling said brake actuating device with the motive power therefor.

3. A coasting brake mechanism comprising a rotatable wheel hub having a braking surface, a stationary brake member, a brake actuator, a brake shoe held in non-rotatable position by said stationary member and having a flexible connection interposed between said stationary member and one end of said shoe, means between said brake actuator and the opposite end of said shoe for forcing said shoe bodily into braking contact with said braking surface of the hub on the backward movement of said brake actuator, and means for coupling said brake actuating device with the motive power therefor.

4. In a hub brake, a coasting wheel hub provided on its inner periphery with a braking surface, a stationary brake member, a plurality of movable braking elements or shoes secured in non-rotatable position by said stationary brake member, a brake actuator, means for connecting one end of each of said shoes flexibly to said stationary brake member, means interposed between said brake actuator and the opposite ends of said shoes for forcing said shoes bodily into braking contact with said braking surface of the hub on reversing the driving pressure, and means for coupling said brake actuator with the motive power therefor.

5. In a brake mechanism for cycles, the combination with a wheel hub having an inner braking surface, of a brake actuator, a stationary anchoring plate, a plurality of brake shoes secured in non-rotatable position by said anchoring plate, each shoe being provided at one end with a toggle link connecting it movably to said anchoring plate, means between said brake actuator and the opposite ends of said shoes for forcing said shoes bodily into braking contact with said braking surface of the hub, on the backward movement of said actuator, and means for connecting said brake actuator with the motive power therefor.

6. In a cycle wheel hub, the combination of a supporting shaft, a driving sleeve rotatable thereon, means for driving said sleeve, an outer or wheel hub rotatable upon said driving sleeve and provided with an inner braking surface, means for clutching together and unclutching said driving sleeve and outer hub, a plurality of independent brake shoes arranged in braking relation to said braking surface, and means for moving said shoes bodily in an outward, and slightly rotative, direction into contact with said braking surface of the hub by pressure exerted upon said shoes in the direction of the forward rotation of said wheel hub.

7. In a bicycle hub, the combination of a supporting shaft, a driving sleeve rotatively supported thereon and provided with a driving member, an outer or wheel hub rotatably supported on said driving sleeve and provided with a braking surface, means for connecting said driving sleeve and wheel hub together for driving and releasing the same for coasting, a fixed brake-anchoring plate, a plurality of brake shoes, each having one end connected movably by a toggle connection to said plate, and means for moving said shoes bodily into braking connection with said braking surface of the hub by pressure exerted upon the opposite end of said shoes.

8. In a coasting and braking wheel hub, the combination of a supporting shaft, a driving sleeve rotatably supported thereon and provided at one end with a driving member, an outer or wheel hub supported rotatably on said driving sleeve and provided with a braking surface, brake mechanism arranged in braking relation to said braking surface, a brake actuator, an operative flexible connection between said brake actuator and said brake mechanism, a clutch sleeve between said driving sleeve and outer hub, means for clutching said clutch sleeve and outer hub together for driving and releasing the same for coasting, said brake actuator and clutch sleeve being provided with corresponding teeth radiating on lines diagonal to their axes and arranged to mesh for actuating the brake on reversing the driving sleeve, and a spiral connection between the driving and clutch sleeves for causing said clutch sleeve to move laterally relatively to said driving sleeve to engage said brake mechanism on reversing said driving sleeve.

9. The combination with a supporting shaft and a wheel hub having a braking surface, of a driving member provided with a connected sleeve projected laterally within the hub, a brake mechanism comprising a brake actuator, a fixed anchoring plate, a plurality of brake shoes supported thereby, means for moving said shoes bodily against said braking surface of the hub, and a clutch connection for connecting said sleeve to the brake mechanism, said sleeve having one end supported rotatably on said supporting shaft and the opposite end supported by said brake actuator.

10. In a coasting wheel hub, the combination of a supporting shaft, a wheel hub to which the spokes are attached, a driving sleeve projected within said hub, a brake mechanism embodying a brake actuator, means for clutching said driving sleeve and hub together for driving and releasing the same for coasting, means for applying the brake on reversing the driving sleeve, and means for supporting said driving sleeve rotatably at one end upon said supporting shaft and at the opposite end upon said brake actuator.

WILLIAM ROBINSON.

Witnesses:
 GEO. L. FOWLER,
 THOMAS LEAK.